United States Patent
Alamaunu et al.

(10) Patent No.: US 10,924,771 B2
(45) Date of Patent: Feb. 16, 2021

(54) METHOD FOR MANAGING MEDIA STREAMS

(71) Applicant: Teleste Oyj, Littoinen (FI)

(72) Inventors: Jyrki Alamaunu, Turku (FI); Kari Virtanen, Naantali (FI); Jani Väre, Kaarina (FI)

(73) Assignee: Teleste Oyj, Littoinen (FI)

( * ) Notice: Subject to any disclaimer, the term of this patent is extended or adjusted under 35 U.S.C. 154(b) by 0 days.

(21) Appl. No.: 16/469,725

(22) PCT Filed: Dec. 19, 2016

(86) PCT No.: PCT/FI2016/050898
§ 371 (c)(1),
(2) Date: Jun. 14, 2019

(87) PCT Pub. No.: WO2018/115568
PCT Pub. Date: Jun. 28, 2018

(65) Prior Publication Data
US 2020/0084479 A1    Mar. 12, 2020

(51) Int. Cl.
*H04N 21/214* (2011.01)
*H04N 21/2662* (2011.01)
(Continued)

(52) U.S. Cl.
CPC ..... *H04N 21/2146* (2013.01); *H04N 21/2662* (2013.01); *H04N 21/4126* (2013.01);
(Continued)

(58) Field of Classification Search
CPC ........... H04N 21/2146; H04N 21/2662; H04N 21/4126; H04N 21/436
See application file for complete search history.

(56) References Cited

U.S. PATENT DOCUMENTS

2011/0222426 A1   9/2011  Chazel
2017/0374493 A1*  12/2017  Pereira Cabral ........ H04W 4/70

FOREIGN PATENT DOCUMENTS

DE   102014200226 A1   7/2015
EP      2629538 A1   8/2013
(Continued)

OTHER PUBLICATIONS

Riiser Haakon et al. Bitrate and video quality planning for mobile streaming scenarios using a GPS-based bandwidth lookup service, Netview Technology AS, Norway / Simila Research Laboratory, Norway / Department of Informatics, Jniversity of Oslo, Norway.(6 pages).

*Primary Examiner* — Sumaiya A Chowdhury
(74) *Attorney, Agent, or Firm* — Berggren LLP (57) ABSTRACT

A method for providing media content in a public transportation vehicle comprising a mobile router, the method comprising: receiving, in the mobile router, one or more media streams from a media source; monitoring first connection parameters relating to a first connection between the mobile router and the media source and second connection parameters relating to a second connection between the mobile router and one or more client devices; determining, on the basis of said first and second connection parameters, optimized stream configuration for each of said one or more media streams; and providing each of said one or more media streams only according to the optimized stream configuration to said one or more client devices.

18 Claims, 3 Drawing Sheets

(51) Int. Cl.
  *H04N 21/41* (2011.01)
  *H04N 21/436* (2011.01)
  *H04N 21/4402* (2011.01)
  *H04N 21/442* (2011.01)
  *H04N 21/643* (2011.01)

(52) U.S. Cl.
  CPC ..... *H04N 21/436* (2013.01); *H04N 21/44029* (2013.01); *H04N 21/44209* (2013.01); *H04N 21/643* (2013.01)

(56) References Cited

FOREIGN PATENT DOCUMENTS

| EP | 2942971 A1 * | 11/2015 | ....... H04N 21/44209 |
|----|--------------|---------|----------------------|
| EP | 2942971 A1   | 11/2015 |                      |

* cited by examiner

METHOD FOR MANAGING MEDIA STREAMS

PRIORITY

This application is a U.S. national application of the international application number PCT/FI2016/050898 filed on Dec. 29, 2016, the contents of which are incorporated herein by reference.

TECHNICAL FIELD

The invention relates to managing the media streams within public transportation vehicles

BACKGROUND

It may be desirable for a passenger in a public transport to have a possibility to browse multimedia content, such as movies and other media clips. As portable multimedia devices have become popular, many passengers have a multimedia device of their own. Many public transportation operators have started to offer a wireless data connection, such as a Wi-Fi connection, for the passengers to use during their trip.

A specific challenge in wireless data traffic is the data delivery to and from mobile vehicles, especially public transportation vehicles, like trains, trams, metro trains and busses. A moving vehicle, as such, poses challenges to reliable data transfer, where the usable data rate typically reduces as a function of the speed of the vehicle. For example, broadcast TV networks (e.g. DVB-T and DVB-T2) are typically configured for fixed reception with stationary antennas. Hence, DVB transmission cannot be received in vehicles moving with a high speed.

For solving the problem, various kinds of ground-to-invehicle systems have been proposed, where the broadcast transmission is received in a ground system, which converts the broadcasts into a format which can be transported more easily to the vehicular data system. For example, the DVB broadcasts may be converted into HLS (HTTP Live Streaming) streams, which can then be accessed by the vehicular system e.g. via 3G/4G or Wi-Fi base stations.

In such systems, an in-vehicle HTTP Proxy, HLS proxy or buffer can be used to manage the bitrate limitations of HLS streaming on the link from the ground system to the vehicle. However, in such systems, the bandwidth sharing between different end users is not managed, which may result in a situation where a major part of the available bandwidth is allocated to one user, and hence other users' capability to consume different content is limited.

SUMMARY

Now, an improved arrangement has been developed to at least alleviate the above-mentioned problems. As different aspects of the invention, we present a method, a system, an apparatus and a computer program product, which are characterized in what will be presented in the independent claims.

The dependent claims disclose various embodiments of the invention.

The first aspect of the invention comprises a method for providing media content in a public transportation vehicle comprising a mobile router, the method comprising: receiving, in the mobile router, one or more media streams from a media source; monitoring first connection parameters relating to a first connection between the mobile router and the media source and second connection parameters relating to a second connection between the mobile router and one or more client devices; determining, on the basis of said first and second connection parameters, optimized stream configuration for each of said one or more media streams; and providing each of said one or more media streams only according to the optimized stream configuration to said one or more client devices.

According to an embodiment, the method further comprises receiving, in the mobile router, information about a plurality of stream configurations for said one or more media streams provided by the media source; and selecting, from the plurality of stream configurations, the optimized stream configuration for each of said one or more media streams to be provided to said one or more client devices.

According to an embodiment, the method further comprises adjusting bit rate of at least one media stream to comply with the optimized stream configuration.

According to an embodiment, the method further comprises checking, in response to one client device attempting to join an existing media stream, whether at least one of the second connection parameters exceeds a first predetermined threshold value; if affirmative, preventing said client device to join said existing media stream; or otherwise, allowing said client device to join said existing media stream.

According to an embodiment, the method further comprises checking, in response to allowing said client device to join said existing media stream, whether at least one of the second connection parameters exceeds a second predetermined threshold value; if affirmative, re-determining, on the basis of said first and second connection parameters, optimized stream configuration for each of said one or more media streams; or otherwise, providing said existing media stream with unchanged stream configuration.

According to an embodiment, the method further comprises checking, in response to one client device attempting to establish a new media stream, whether at least one of the second connection parameters exceeds a first predetermined threshold value; if affirmative, preventing said client device to establish said new media stream; or otherwise, allowing said client device to establish said new media stream.

According to an embodiment, the method further comprises checking, in response to allowing said client device to establish said new media stream, whether at least one of the second connection parameters exceeds a second predetermined threshold value; if affirmative, re-determining, on the basis of said first and second connection parameters, optimized stream configuration for each of a plurality of media streams; or otherwise, establishing said new media stream with default stream configuration.

According to an embodiment, the first connection parameters comprise quality-of-service (QoS) parameters of the first connection between the mobile router and the media source.

According to an embodiment, the second connection parameters comprise one or more of the following:

quality-of-service (QoS) parameters of the second connection between the mobile router and the one or more client devices;

number of media streams being provided to the one or more client devices;

number of client devices browsing said one or more media streams.

According to an embodiment, the second connection between the mobile router and the one or more client devices is carried out according to any of IEEE 802.11 standard series.

The second and third aspects of the invention comprise a computer program product and an apparatus (mobile router) arranged to operate according to the method.

The fourth aspect of the invention comprises a system comprising: a ground system comprising a media source for providing media content in form of one or more media streams; an on-board system arranged in a public transportation vehicle comprising a mobile router, wherein the mobile router is arranged to: receive one or more media streams from the media source; monitor first connection parameters relating to a first connection between the mobile router and the media source and second connection parameters relating to a second connection between the mobile router and one or more client devices; determine, on the basis of said first and second connection parameters, optimized stream configuration for each of said one or more media streams; and provide each of said one or more media streams only according to the optimized stream configuration to said one or more client devices.

According to an embodiment, the ground system comprises one or more media content providers and one or more media converters.

According to an embodiment, at least one content provider is a broadcast operator arranged to provide TV programs over a broadcast network.

According to an embodiment, the media converter comprises a receiver arranged to receive a broadcast transmission and a media conversion unit for converting the received broadcast transmissions into media streams, such as HLS streams.

According to an embodiment, the ground system further comprises a distribution server arranged to receive client requests and to deliver the requested media segments to the clients.

BRIEF DESCRIPTION OF THE DRAWINGS

The invention will now be described in more detail in connection with preferred embodiments with reference to the appended drawings, in which.

DETAILED DESCRIPTION

Figure 1:
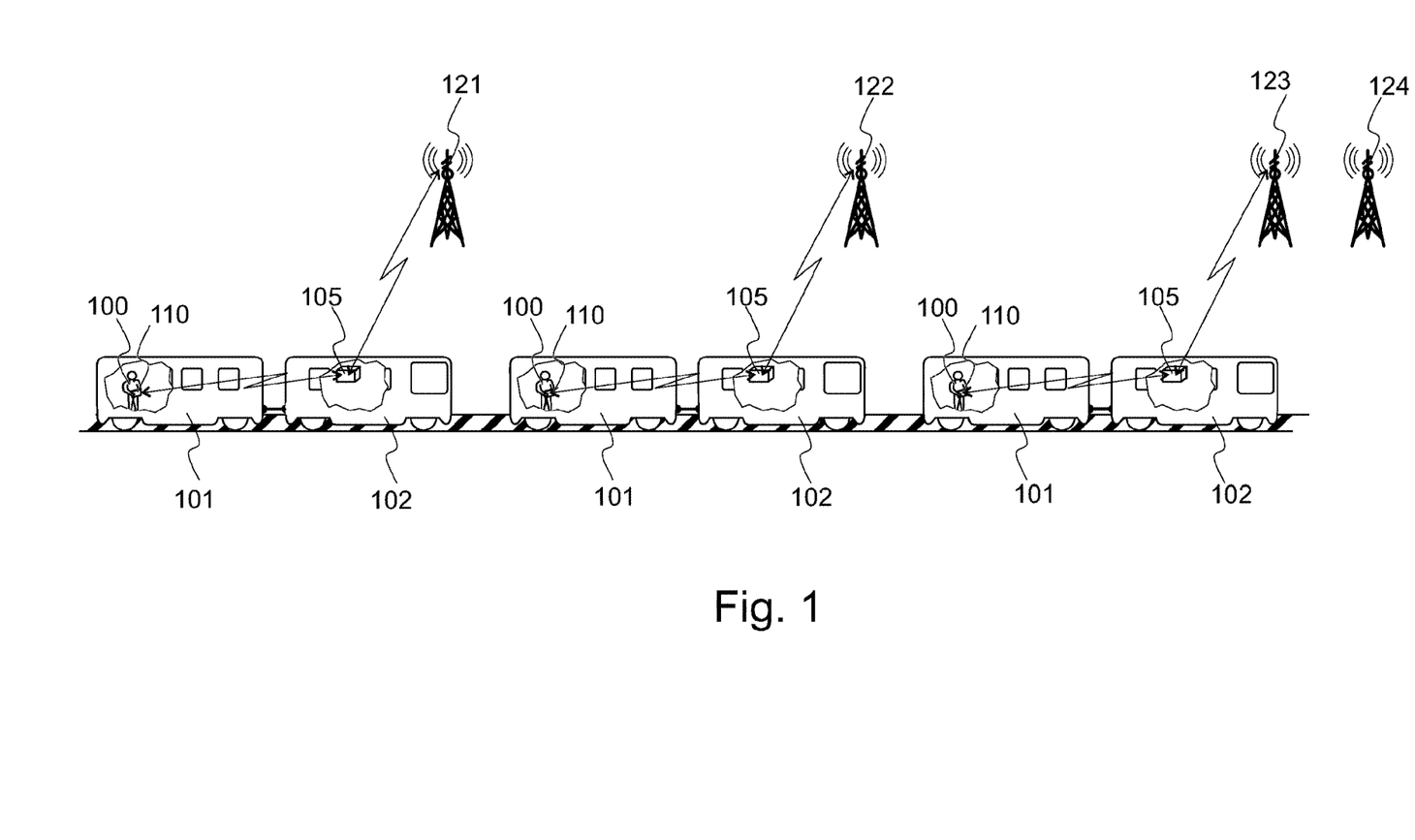
FIG. 1 shows a simplified example the operating principle of a wireless data transmission in vehicular systems.

FIG. 1 shows an example of the operating principle of a wireless data transmission in vehicular systems, e.g. in public transportation vehicles, such as in trains or buses. FIG. 1 illustrates a rail traffic vehicle, such as a train, a tram or a metro train, travelling on the rails. The rail traffic vehicle may comprise one or more cars 101, 102, typically arranged to transport passengers. A wireless data connection, such as a Wi-Fi connection, may be offered for the passengers to be used during their trip. In FIG. 1, a passenger 100 uses his/her mobile device via a wireless connection provided by a wireless base station located in the vehicle.

The passenger may want to browse multimedia content, e.g. a movie, using his/her portable multimedia device 110, e.g. a smartphone, laptop, or a tablet computer.

A public transportation vehicle is typically arranged to travel a predetermined route, whereby a plurality of wireless links 121, 122, 123, 124 may be arranged along the route. The vehicle may comprise at least one wireless base station or a mobile communication unit, which is arranged to communicate with at least one wireless link 121, 122, 123, 124 arranged along the route of the vehicle. The mobile communication unit may be arranged to receive data from one or more data sources, such as one or more storage devices, the internet service and/or one or more devices operated by passengers, arranged in functional connection with the mobile communication unit. The mobile communication unit may comprise a receiver arranged to receive the data from the at least one wireless link 121, 122, 123, 124. The mobile communication unit may be in functional connection with at least one data storage 105 located in the vehicle.

Depending on the amount of data to be transmitted, an appropriate wireless transmission technology may be used. For example, the contemporary and the future mobile communication networks, such as the 4G/LTE and 5G networks provide very high bit rate for multimedia transmission. Mobile communication networks may provide a reliable transmission platform, for example, to trains and busses travelling in rural areas. On the other hand, any wireless access technology defined in IEEE standard series 802.11, including multiple versions of the IEEE 802.11, such as 802.11b, 802.11g, 802.11a, 802.11n, 802.11ac, 802.11ad, may be used herein, especially when operating a public transportation vehicle within urban areas.

HTTP Live Streaming (HLS) is the most widely adopted Internet video delivery protocol and it is widely supported in mobile operating systems and modern browsers. This makes it currently a de-facto standard for OTT video delivery. Instead of streaming the video from a server to a playback client, the client is essentially downloading video as multiple HLS segments using HTTP protocol. The length of a HLS segment is typically equivalent to a playback time of 10 seconds. The relatively large file length, together with the fact that the client device may often select from multiple bitrates, makes the HLS resistant to short-term congestion. This makes HLS a very favorable technique to stream video files stored in a network server.

It is noted that the embodiments described below are not limited to HLS streaming systems solely, but they can be implemented in any similar system as the technology advances. For example, Dynamic Adaptive Streaming over HTTP (DASH), (a.k.a. MPEG-DASH) streaming system may be utilised in the implementation.

Figure 2:
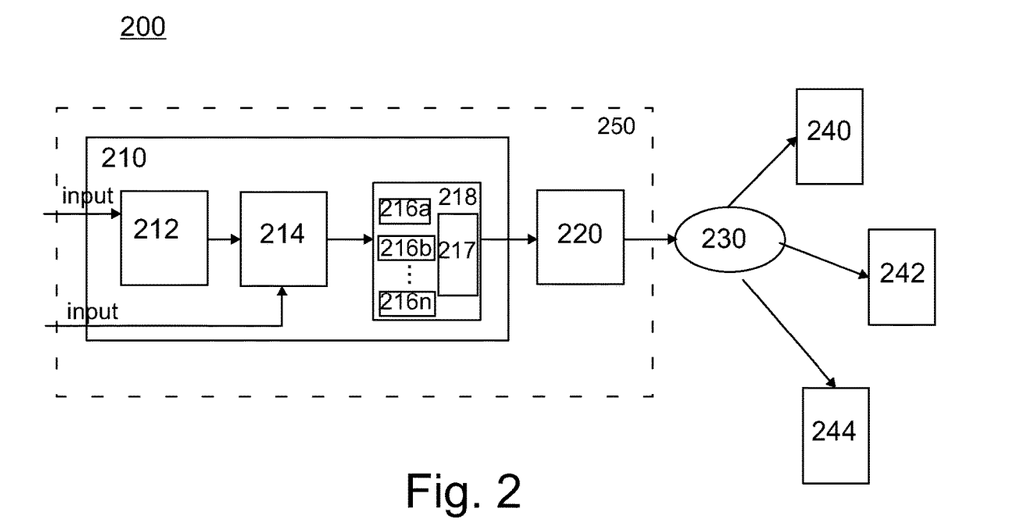
FIG. 2 shows an example of operating principle of a streaming system.

The operating principle of a streaming system, such as a HLS or a DASH system, is illustrated in FIG. 2. FIG. 2 shows a functional block diagram of an exemplary streaming system 200 including a media server 210, a distribution server 220 and a communication network 230 for delivering media data to one or more client devices 240, 242, 244. From the perspective of the client devices, the media server 210 and the distribution server 220 may be considered together to form a media source 250.

The media server 210 takes input streams of media and the encoder 212 encodes the streams according to a predetermined encoding scheme and encapsulates the encoded streams in a format suitable for delivery. In current HLS systems, the streams are encoded according to MPEG-2 encoding and they are encapsulated as MPEG-2 Transport Streams (MPEG-2 TS). The segmenter 214 organizes the encoded input media stream as a plurality of coded segments 216a-216n and generates a playlist 217 to identify the segments. In HLS systems, the coded segments may also be referred to as HLS segments. The input media stream may also be readily in the MPEG-2 TS format, in which case the encoded input media stream may be provided directly to the segmenter 214.

Each coded segment may be stored by the media server 210 at locations that can be referenced by unique URLs (Uniform Resource Locators). Each coded segment is indexed by the media server, whereupon e.g. the URL, a program date and time are associated with the coded segment in an index file.

The playlist is created on the basis of the index files, and it identifies the available media streams and the locations of each segment as stored at the media source. The playlist 217 and coded segments of the available media resources 216a-216n are stored in data storage 218, which is accessible by the distribution server 220. The playlist is published to the client devices and it includes a plurality of tags that provide information to the client regarding the content of the media stream.

The distribution servers 220 are typically standard web servers. It is noted that while FIG. 2 shows the data storage 218 as residing in the media server, it may as well be provided in the distribution server or in both. The distribution server 220 is responsible for accepting client requests and delivering prepared media and associated resources to the client. The distribution server 220 maintains and publishes URLs of the playlists of the media source 210, on the basis of which the client requests may be generated. Upon a request from a client device 240, 242, 244, the distribution server 220 may transmit the coded segments 216a-216n via one or more channels of the communication network 230.

For streaming applications involving live video, the media server 210 and/or the distribution server 220 may buffer coded video segments for a predetermined amount of time. The buffer is continually updated such that older segments are deleted from the buffer as new segments are generated and stored. Similarly, the playlist 217 is updated over time according to sliding window principle to reflect the updated content of the buffer.

The client devices 240, 242, 244 may be provided with standard media players that request and download coded segments from the distribution server 220. The coded segments are decoded and rendered for playback. The client device downloads the playlist 217 from the distribution server 220, whereupon the client device may request a particular coded segment for delivery and decoding. After decoding and rendering the requested coded segment, the client device may request the next entry in the playlist 217 from the distribution server 220. The client device may periodically refresh its copy of the playlist 217 and continue with the above process by downloading further coded segments from the distribution server 220 until the client device discontinues playing the media stream.

It is noted that the streaming system 200 of FIG. 2 is only shown for illustrative purposes, and the actual configuration, topology and architecture of the streaming system may vary in multiple ways. For example, a distribution server 220 may transmit multiple (different) media streams to multiple client devices. On the other hand, the distribution server 220 may transmit a common media stream to multiple client devices using different bit rates and/or different frame sizes according to playback capabilities of different types of client devices. Moreover, various network architectures may be used between the media source 250 and the client devices 240, 242, 244. For example, there may be gateway devices or routers providing a connection to the client device by a wired or wireless local area network.

Considering the structure of the streaming system 200 of FIG. 2 implemented in a ground-to-in-vehicle system for providing broadcast media files as media steams to passengers of public transportation vehicles, the ground system may be considered to form the media source 250 and the client devices 240, 242, 244 refer to the portable multimedia devices of the passengers. Various ground-to-in-vehicle systems have been proposed where an HTTP Proxy, HLS proxy or buffer is implemented in the vehicle as a router providing a connection to the client device by a wireless local area network. In such configuration, the communication network 230 in FIG. 2 may be considered to be split in two parts: a first part from the distribution server 220 of the ground system to the proxy in the vehicle, using for example a 3G/4G/5G mobile network or a Wi-Fi connection, and a second part within vehicle, i.e. from the proxy to the client devices 240, 242, 244 using e.g. Wi-Fi connection.

The proxy is used to manage the bitrate limitations of HLS streaming on the link from the ground system to the vehicle. However, the proxy does not provide for managing the bandwidth sharing between different end users, which may result in a situation where a major part of the available bandwidth is allocated to one user, and hence other users' capability to consume different content is limited.

Thus, there is a need for a solution for managing the media streams within the vehicle in more optimized manner.

Figure 3:
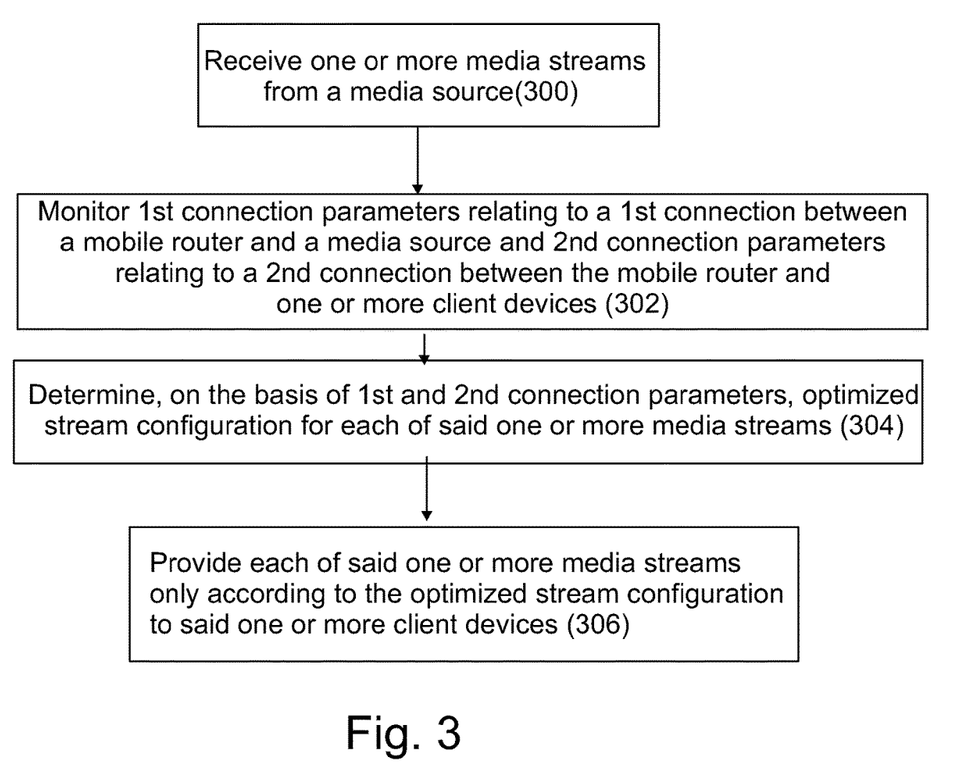
FIG. 3 shows a flow chart of a media stream managing process according to an embodiment.

In order to alleviate these problems, a new method for managing the media streams within the vehicle is presented herein. In the method, which is disclosed in FIG. 3, media content is provided in a public transportation vehicle comprising a mobile router, and the method comprises receiving (300), in the mobile router, one or more media streams from a streaming server; monitoring (302) first connection parameters relating to a first connection between the mobile router and the media source and second connection parameters relating to a second connection between the mobile router and one or more client devices; determining (304), on the basis of said first and second connection parameters, optimized stream configuration for each of said one or more media streams; and providing (306) each of said one or more media streams only according to the optimized stream configuration to said one or more client devices.

Thus, there is provided a mobile router in the public transportation vehicle, which mobile router monitors, besides the connection between the mobile router and the media source, but also connections from the mobile router to the client devices. On the basis of the monitored connection parameters, the mobile router determines only one optimized stream configuration for each of the one or more media streams. Consequently, only one stream configuration per media stream is offered to the client devices. This enables the mobile router to constantly seek for an optimal balance of configuration between alternating connection parameters both on the IP connection to the streaming/distribution server and within the vehicle, the number of media streams being browsed and the number of client devices browsing the media streams. This also enables the mobile router to prevent one client device to reserve a major part of the available bandwidth within the vehicle.

Figure 4:
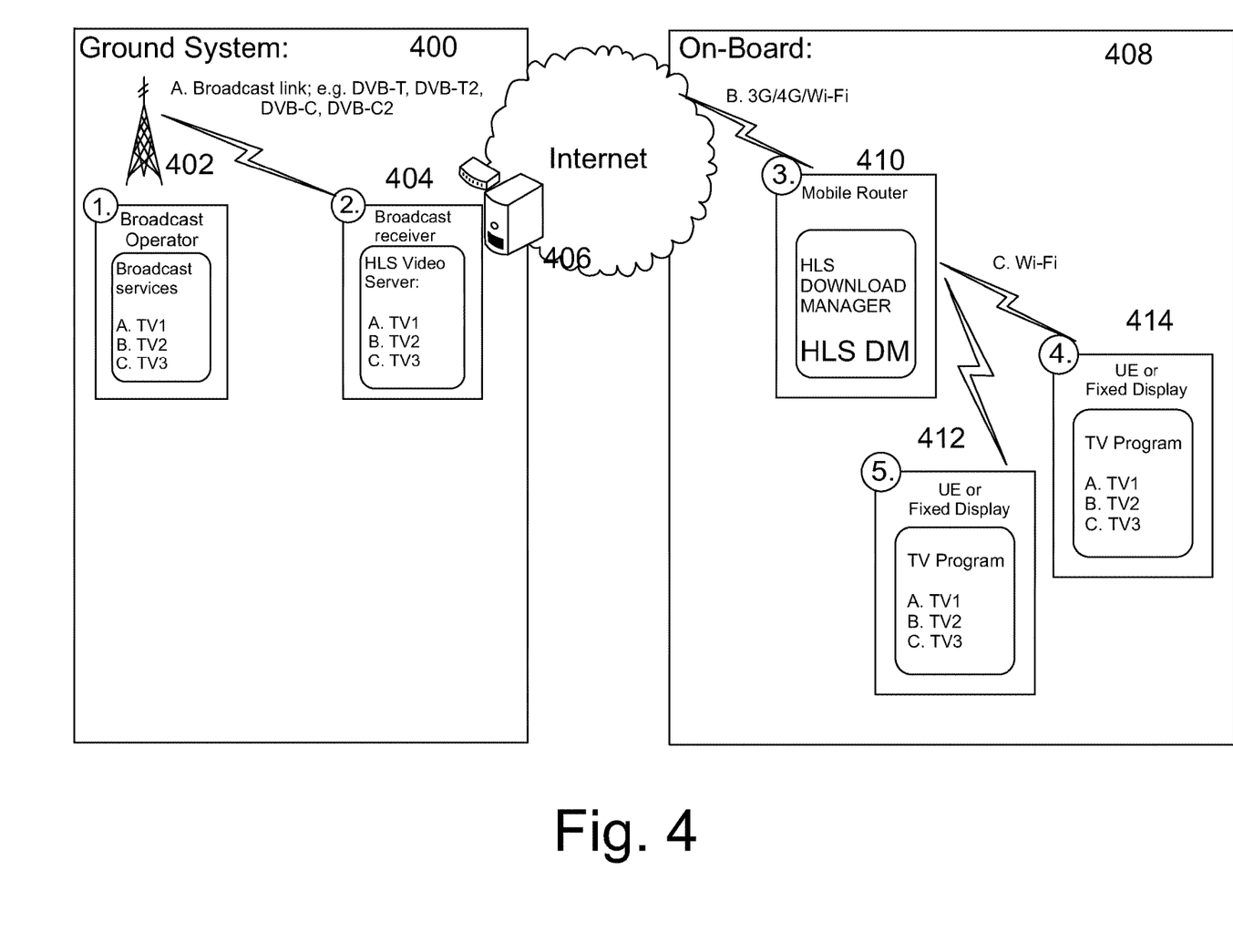
FIG. 4 shows a block chart of a media stream managing system according to an embodiment.

The implementation is illustrated in FIG. 4, where the ground system 400 comprises one or more media content providers 402 and one or more media converters 404. In this example, the media content is provided by a broadcast operator as TV programs over a broadcast network. The broadcast network may be, for example, a terrestrial, cable or satellite DVB network (DVB-T/T2; DVB-C/C2; DVB-S/S2), but a skilled person appreciates that the media content may be provided in any format using any kind of media transportation.

The media converter 402 may comprise a receiver, for example an appropriate DVB receiver, arranged to receive the broadcast transmission and a media conversion unit for converting the received broadcast transmissions into media streams, such as HLS streams. The media converter 404 may operate similarly to the media server 210 in FIG. 2. FIG. 4 further shows a distribution server 406 arranged to receive client requests and to deliver the requested media segments to the clients. The distribution server preferably provides multiple streams with different bitrate options. The distribution server 406 may operate similarly to the distribution server 220 in FIG. 2.

The on-board system 408 is located in a vehicle, for example in a public transportation vehicle, such as a train, a tram, a metro train or a bus. The on-board system 408 comprises one or more mobile routers 410 and one or more client devices 412, 414. The mobile router enables vehicle connection to internet and provides also a wireless connection, such as a WiFi connection, inside the vehicle. The vehicle may comprise a plurality of mobile routers, such as one mobile router per car. The mobile router comprises a functionality, herein referred to as HLS Download Manager (HLS DM), which is arranged to monitor the first connection parameters relating to a first connection, i.e. the IP connection, between the mobile router and the streaming server and second connection parameters relating to a second connection, e.g. a WiFi connection, between the mobile router and one or more client devices. The HLS DM may also monitor the number of media streams being browsed and the number of client devices browsing the media streams. On the basis of the first and second connection parameters, the HLS DM is arranged to determine optimized stream configuration for each of said one or more media streams, whereby the download from the distribution server 406 may also be optimized. The HLS DM then provides only one optimized stream configuration for each media stream, when they are transmitted to the one or more client devices 412, 414. The HLS DM preferably carries out no steam conversion, but it is arranged to adjust the stream configuration such that the stream provided by the distribution server 406 can be forwarded to the client devices without conversion.

The client device may be a portable multimedia device, such as a smartphone, laptop, or a tablet computer, or it may be a display unit fixed to the vehicle. The user of the client device may select a multimedia service to be rendered in his/her client device, whereupon the client device starts establishing a streaming connection to the selected HLS stream offered by the HLS DM.

According to an embodiment, the method further comprises receiving, in the mobile router, information about a plurality of stream configurations for said one or more media streams provided by the media source, e.g. the streaming server; and selecting, from the plurality of stream configurations, the optimized stream configuration for each of said one or more media streams to be provided to said one or more client devices. Thus, the stream configurations of the media streams provided by the media source may preferably be such that the optimized stream configuration can be selected among the provided media streams, and forwarded to the client devices as such, i.e. without any conversion.

According to an embodiment, the method further comprises adjusting bit rate of at least one media stream to comply with the optimized stream configuration. Herein, if no optimized stream configuration can be selected among the media streams provided by the media source, the HLS DM may adjust the bit rate of at least one media stream. This may mean that the HLS DM sends a request to the distribution server to adjust bit rate of the provided media streams, or the HLS DM adjusts the bit rate of at least one stream provided within the vehicle. The adjusting preferably relates to the bit rate; in other words, no stream conversion to other format is preferably carried out.

According to an embodiment, the method further comprises checking, in response to one client device attempting to join an existing media stream, whether at least one of the second connection parameters exceeds a first predetermined threshold value; if affirmative, preventing said client device to join said existing media stream; or otherwise, allowing said client device to join said existing media stream.

Thus, the HLS DM continuously monitors the number of users, the number of existing streams and their connection parameters. There may be a first predetermined threshold value set, for example, to the maximum number of users allowed to stream a particular media stream. When a new client device attempts to join said media stream, the HLS DM checks if there already is the maximum number of users streaming said stream, and the HLS DM then makes a decision to whether or not allow the new client device to join the media stream.

According to an embodiment, the method further comprises checking, in response to allowing said client device to join said existing media stream, whether at least one of the second connection parameters exceeds a second predetermined threshold value; if affirmative, re-determining, on the basis of said first and second connection parameters, optimized stream configuration for each of said one or more media streams; or otherwise, providing said existing media stream with unchanged stream configuration.

Adding a new client device to streaming a media stream may cause, for example, the offered bandwidth within the vehicle to drop below a certain threshold. On the other hand, connection problems on the first connection between the mobile router and the media source may cause the bit rate of the second connections between the HLS DM and the client devices to drop below a certain threshold. Thus, there may be a plurality of second predetermined threshold values for the connection parameters monitored by the HLS DM, which may trigger the HLS DM to re-determine the optimized stream configuration, if at least one value of the connection parameters drops below the second predetermined threshold value.

According to an embodiment, the method further comprises checking, in response to one client device attempting to establish a new media stream, whether at least one of the second connection parameters exceeds a first predetermined threshold value; if affirmative, preventing said client device to establish said new media stream; or otherwise, allowing said client device to establish said new media stream.

Herein, the same procedure a described above relating to joining to existing media streams can be applied when establishing a new media stream. Thus, there may be a first predetermined threshold value set, for example, to the maximum number of existing media streams and/or the maximum number of users allowed to stream media streams in general (not limited to any particular stream). When a new client device attempts to establish a new media stream, the HLS DM checks if there already is maximum number of existing media streams and/or the maximum number of streaming users, and the HLS DM then makes a decision to whether or not allow the new client device to establish the media stream.

According to an embodiment, the method further comprises checking, in response to allowing said client device to establish said new media stream, whether at least one of the second connection parameters exceeds a second predetermined threshold value; if affirmative, re-determining, on the basis of said first and second connection parameters, optimized stream configuration for each of a plurality of media streams; or otherwise, establishing said new media stream with default stream configuration.

When a new media stream is established within the vehicle, it may cause, for example, the bandwidth offered for each of the media streams within the vehicle to drop below a certain threshold. On the other hand, adding a new stream to downloaded from the media source may narrow the bandwidth per media stream on the first connection between the mobile router and the media source, which may cause the bit rate of the second connections between the HLS DM and the client devices to drop below a certain threshold. Thus, the HLS may re-determine the optimized stream configuration for each of the existing media streams, if at least one value of the connection parameters drops below the second predetermined threshold value.

According to an embodiment, the first connection parameters comprise quality-of-service (QoS) parameters of the first connection between the mobile router and the media source, such as the distribution server.

According to an embodiment, the second connection parameters comprise one or more of the following:

quality-of-service (QoS) parameters of the second connection between the mobile router and the one or more client devices;

number of media streams being provided to the one or more client devices;

number of client devices browsing said one or more media streams.

According to an embodiment, the second connection between the mobile router and the one or more client devices is carried out according to any of IEEE 802.11 standard series. While various names and acronyms, such as WLAN, Wi-Fi, 802.11, etc. are used for wireless local area networks, they all typically refer to wireless access technology defined in IEEE standard series 802.11, including multiple versions of the IEEE 802.11, such as 802.11b, 802.11g, 802.11a, 802.11n, 802.11ac. It is, however, noted that the implementation of the embodiments disclosed herein are not limited to the WLAN technology according to any of IEEE 802.11 standard series only, but the embodiments may be applied to any similar wireless communication technology.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such non-transitory physical media as memory chips, or memory blocks implemented within the processor, magnetic media such as hard disk or floppy disks, and optical media such as for example DVD and the data variants thereof, CD.

A skilled person appreciates that any of the embodiments described above may be implemented as a combination with one or more of the other embodiments, unless there is explicitly or implicitly stated that certain embodiments are only alternatives to each other.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for providing media content in a public transportation vehicle comprising a mobile router, the method comprising:
   receiving, in the mobile router, one or more media streams from a media source;
   receiving, in the mobile router, information about a plurality of stream configurations for said one or more media streams provided by the media source;
   monitoring first connection parameters relating to a first connection between the mobile router and the media source and second connection parameters relating to a second connection between the mobile router and one or more client devices;
   determining, on the basis of said first and second connection parameters, optimized stream configuration for each of said one or more media streams by selecting, from the plurality of stream configurations, the optimized stream configuration for each of said one or more media streams; and
   providing each of said one or more media streams only according to the optimized stream configuration to said one or more client devices.

2. The method according to claim 1, further comprising adjusting bit rate of at least one media stream to comply with the optimized stream configuration.

3. The method according to claim 1, further comprising checking, in response to one client device attempting to join an existing media stream, whether at least one of the second connection parameters exceeds a first predetermined threshold value; if affirmative, preventing said client device to join said existing media stream; or otherwise, allowing said client device to join said existing media stream.

4. The method according to claim 3, further comprising checking, in response to allowing said client device to join said existing media stream, whether at least one of the second connection parameters exceeds a second predetermined threshold value; if affirmative, re-determining, on the basis of said first and second connection parameters, optimized stream configuration for each of said one or more media streams; or otherwise, providing said existing media stream with unchanged stream configuration.

5. The method according to claim 1, further comprising checking, in response to one client device attempting to establish a new media stream, whether at least one of the second connection parameters exceeds a first predetermined threshold value; if affirmative, preventing said client device to establish said new media stream; or otherwise, allowing said client device to establish said new media stream.

6. The method according to claim 5, further comprising checking, in response to allowing said client device to establish said new media stream, whether at least one of the second connection parameters exceeds a second predetermined threshold value; if affirmative, re-determining, on the basis of said first and second connection parameters, optimized stream configuration for each of a plurality of media streams; or otherwise, establishing said new media stream with default stream configuration.

7. An apparatus for providing media content in a public transportation vehicle, the apparatus comprising: a receiver configured to receive one or more media streams from a media source; and receive information about a plurality of stream configurations for said one or more media streams provided by the media source; a functionality configured to monitor first connection parameters relating to a first connection between the apparatus and the media source and second connection parameters relating to a second connection between the apparatus and one or more client devices; determine, on the basis of said first and second connection parameters, optimized stream configuration for each of said one or more media streams by selecting, from the plurality of stream configurations, the optimized stream configuration for each of said one or more media streams; and provide each of said one or more media streams only according to the optimized stream configuration to said one or more client devices.

8. The apparatus according to claim 7, wherein said functionality is configured to adjust bit rate of at least one media stream to comply with the optimized stream configuration.

9. The apparatus according to claim 7, wherein said apparatus is arranged to check, in response to one client device attempting to join an existing media stream, whether at least one of the second connection parameters exceeds a first predetermined threshold value; if affirmative, prevent said client device to join said existing media stream; or otherwise, allow said client device to join said existing media stream.

10. The apparatus according to claim 9, wherein said apparatus is further arranged to check, in response to allowing said client device to join said existing media stream, whether at least one of the second connection parameters exceeds a second predetermined threshold value; if affirmative, re-determine, on the basis of said first and second connection parameters, optimized stream configuration for each of said one or more media streams; or otherwise, provide said existing media stream with unchanged stream configuration.

11. The apparatus according to claim 7, wherein said apparatus is arranged to check, in response to one client device attempting to establish a new media stream, whether at least one of the second connection parameters exceeds a first predetermined threshold value; if affirmative, prevent said client device to establish said new media stream; or otherwise, allow said client device to establish said new media stream.

12. The apparatus according to claim 11, wherein said apparatus is further arranged to check, in response to allowing said client device to establish said new media stream, whether at least one of the second connection parameters exceeds a second predetermined threshold value; if affirmative, re-determine, on the basis of said first and second connection parameters, optimized stream configuration for each of a plurality of media streams; or otherwise, establish said new media stream with default stream configuration.

13. The apparatus according to claim 7, wherein the first connection parameters comprise quality-of-service (QoS) parameters of the first connection between the mobile router and the media source.

14. The apparatus according to claim 7, wherein the second connection parameters comprise one or more of the following: quality-of-service (QoS) parameters of the second connection between the apparatus and the one or more client devices; number of media streams being provided to the one or more client devices; number of client devices browsing said one or more media streams.

15. The apparatus according to claim 7, wherein the second connection to the one or more client devices is carried out according to any of IEEE 802.11 standard series.

16. A system comprising: a ground system comprising a media source for providing media content in form of one or more media streams; an on-board system arranged in a public transportation vehicle comprising a mobile router, wherein the mobile router is arranged to; receive one or more media streams from the media source; receive information about a plurality of stream configurations for said one or more media streams provided by the media source; monitor first connection parameters relating to a first connection between the mobile router and the media source and second connection parameters relating to a second connection between the mobile router and one or more client devices; determine, on the basis of said first and second connection parameters, optimized stream configuration for each of said one or more media streams by selecting, from the plurality of stream configurations, the optimized stream configuration for each of said one or more media streams; and provide each of said one or more media streams only according to the optimized stream configuration to said one or more client devices.

17. The system according to claim 16, wherein the ground system comprises one or more media content providers and one or more media converters comprising a receiver configured to receive a broadcast transmission and a media conversion unit configured to convert the received broadcast transmissions into media streams.

18. The system according to claim 16, wherein the ground system further comprises a distribution server arranged to receive client requests and to deliver the requested media segments to the clients.

* * * * *